United States Patent [19]

Chao et al.

[11] Patent Number: 5,139,989
[45] Date of Patent: Aug. 18, 1992

[54] AMORPHOUS SILICA/ALUMINA/PHOSPHATE COMPOSITION AND USES THEREOF

[75] Inventors: Tai-Hsiang Chao, Mt. Prospect; Michael W. Schoonover, Arlington Hgts., both of Ill.

[73] Assignee: UOP, Des Plaines, Ill.

[21] Appl. No.: 751,386

[22] Filed: Aug. 28, 1991

[51] Int. Cl.$^5$ .................. B01J 21/12; B01J 27/182
[52] U.S. Cl. ................... 502/214; 502/208; 502/210; 502/213; 502/238; 502/254; 502/259; 502/335
[58] Field of Search ............... 502/208, 214, 238, 210, 502/213, 254, 259, 335

[56] References Cited

U.S. PATENT DOCUMENTS

| | | | |
|---|---|---|---|
| 3,274,124 | 9/1966 | O'Hara | 252/451 |
| 3,909,450 | 9/1975 | O'Hara | 252/438 |
| 4,158,621 | 6/1979 | Swift et al. | 208/114 |
| 4,243,556 | 1/1981 | Blanton, Jr. | 252/455 Z |
| 4,310,440 | 1/1982 | Wilson et al. | 252/435 |
| 4,440,871 | 4/1984 | Lok et al. | 502/214 |
| 4,520,127 | 5/1985 | Otake et al. | 502/289 |
| 4,629,717 | 12/1986 | Chao | 502/208 |
| 4,727,209 | 2/1988 | Chao | 585/466 |
| 4,760,040 | 7/1988 | Sato et al. | 502/68 |
| 4,791,084 | 12/1988 | Sato et al. | 502/65 |
| 4,870,222 | 9/1989 | Jabrik et al. | 570/234 |

FOREIGN PATENT DOCUMENTS 60018509 1/1985 Japan.
01207389 8/1989 Japan.

Primary Examiner—Anthony McFarlane
Attorney, Agent, or Firm—Thomas K. McBride; Eugene I. Snyder; Frank S. Molinaro

[57] ABSTRACT

This invention relates to a catalytic composite which is an amorphous solid solution of phosphorus, silicon and aluminum oxides. The composite is characterized in that it contains from about 5 to about 50 weight percent $Al_2O_3$, from about 10 to about 90 weight percent $SiO_2$ and from about 5 to about 40 weight percent $P_2O_5$ and has pores whose average diameters range from about 30 to about 200 Angstroms. The composite is further characterized in that it has a pore volume of about 0.35 to about 0.75 cc/g and a surface area of about 200 to about 420 m$^2$/g. The composite may be prepared by forming a mixture of sols of alumina and silica and a phosphorus compound, gelling the mixture to form particles and then calcining the particles to provide the amorphous solid solution. The amorphous composite may be used either as is or with additional catalytic metals (selected from the metals of Group VIB and VIII of the Periodic Table) dispersed thereon to catalyze various hydrocarbon conversion processes such as hydrocracking and alkylation.

12 Claims, No Drawings

AMORPHOUS SILICA/ALUMINA/PHOSPHATE COMPOSITION AND USES THEREOF

FIELD OF THE INVENTION

The present invention relates to a catalytic composite, a process for preparing the composite and processes using the composite. The catalyst of the present invention is an amorphous solid solution of phosphorus, aluminum and silicon oxides. The catalyst may be prepared by mixing a hydrosol of alumina and silica with a phosphorus compound, gelling the mixture to form particles and finally calcining to yield the amorphous catalyst. Finally the catalyst can be used either as is or with metals dispersed thereon to catalyze various hydrocarbon conversion processes such as hydrocracking and alkylation.

BACKGROUND OF THE INVENTION

Alumina is a well known catalyst support and a catalyst. It is also well known that the properties of alumina can be modified in various ways such as by cogelling with silica to form a silica/alumina composite or by incorporating phosphorus to give an alumina/phosphate composite. These modified aluminas are useful in catalyzing various hydrocarbon conversion processes such as hydrocracking, isomerization and alkylation. The prior art shows several ways of preparing these materials which are summarized below.

U.S. Pat. No. 3,909,450 discloses a method of preparing an amorphous silica/alumina composition in which sols of alumina and silica are mixed and then gelled by the well known oil drop method and finally dried to provide the composition. A silica/alumina composition can also be prepared by coprecipitation as described in U.S. Pat. No. 3,274,124.

U.S. Pat. Nos. 4,629,717 and 4,727,209 describe a phosphorus modified alumina composite and hydrocarbon conversion processes using the composite. The composite is amorphous and has a phosphorus to aluminum molar ratio of about 1:1 to 1:100 and has a surface area of about 140 to 450 $m^2/g$.

U.S. Pat. No. 4,760,040 discloses a hydrocarbon cracking catalyst which is composed of a crystalline aluminosilicate zeolite in a phosphorus containing alumina matrix. Similarly U.S. Pat. No. 4,243,556 describes a composition containing silica and alumina, the alumina being promoted by at least one element or compound selected from sodium, manganese and phosphorus. Additionally, U.S. Pat. No. 4,158,621 describes a catalyst comprising an alumina-aluminumphosphate-silica matrix which is amorphous after calcination at 500° C. for 16 hours.

Crystalline silicoaluminophosphates are disclosed in U.S. Pat. No. 4,440,871 while crystalline aluminum phosphates are disclosed in U.S. Pat. No. 4,310,440. Japanese Public Disclosure J01207389-A discloses a catalyst for purifying a hydrocarbon which consists of a support including silica/alumina, the support having dispersed on it phosphoric acid. Finally, Japanese Public Disclosure J60018509-A describes a catalyst which is a mixture of $P_2O_5$ and silica/alumina.

In contrast to this prior art, applicants have prepared a catalytic composite whihc comprises an amorphous solid solution of phosphorus, aluminum and silicon oxides (hereinafter referred to as an amorphous silica/alumina/phosphate). Generally a solid solution is simply a solid phase containing more than one component. One class of solid solution is a substitutional solid solution in which solute atoms or groups of atoms are substituted for solvent atoms or groups in the crystal structure. The substitution of one atom or groups for another is possible only when the substituents do not differ greatly in size. Thus, in the present system phosphorus and silicon atoms have been substituted into positions ordinarily occupied by aluminum atoms. Clearly this is different from the systems in which phosphoric acid or other phosphorus compounds are impregnated onto an alumina or a silica/alumina substrate or support. It is also different from Japanese Public Disclosure J60018509-A in that there is no separate $P_2O_5$ phase which has been mixed in with a silica/alumina powder.

The properties of the instant catalytic composite are also different from the heterogeneous materials described in the prior art. For example, the acidity of the instant catalyst is derived from the amount of silica present in the composition whereas in prior art catalysts it is primarily derived from the presence of free phosphate on the catalyst. Also the porosity of the instant catalyst is controlled by polymer packing during gelation of the catalyst particles.

SUMMARY OF THE INVENTION

As stated, the instant invention relates to a catalytic composite, a process for preparing the composite and processes using the composite. Accordingly, one embodiment of the invention is a catalytic composite comprising an amorphous solid solution of phosphorus, silicon and aluminum oxides containing from about 5 to about 50 weight percent $Al_2O_3$, from about 10 to about 90 weight percent $SiO_2$ and from about 5 to about 40 weight percent $P_2O_5$.

Another embodiment of the invention is a process for preparing a catalytic composite comprising an amorphous solid solution of phosphorus, silicon and aluminum oxides containing from about 5 to about 50 weight percent $Al_2O_3$, from about 10 to about 90 weight percent $SiO_2$ and from about 5 to about 40 weight percent $P_2O_5$, the process comprising forming a mixture of an alumina hydrosol, a silica hydrosol and a phosphorus compound, gelling the mixture to form particles and calcining the particles to provide an amorphous solid solution of phosphorus, silicon and aluminum oxides.

A further embodiment of the invention is a hydrocarbon conversion process comprising contacting a hydrocarbon under hydrocarbon conversion conditions with a catalytic composite to give a hydroconverted product, the catalytic composite comprising an amorphous solid solution of phosphorus, silicon and aluminum oxides containing from about 5 to about 50 weight percent $Al_2O_3$, from about 10 to about 90 weight percent $SiO_2$ and from about 5 to about 40 weight percent $P_2O_5$.

Other objects and embodiments will become more apparent after a more detailed description of the invention.

DETAILED DESCRIPTION OF THE INVENTION

As stated, this invention relates to a catalytic composite which is an amorphous solid solution of phosphorus, aluminum and silicon oxides, a process for preparing the composite and processes using the composite.

Generally the composite is prepared by forming a mixture which consists of an alumina sol, a silica sol and a phosphorus compound. Alumina sols are well known in the art and are prepared by digesting aluminum in a strong acid such as aqueous hydrochloric acid at about reflux temperatures, usually from about 80° to about 105° C. The ratio of aluminum to chloride in the sol ranges from about 0.7:1 to about 1.5:1 weight ratio. Silica sols are also well known in the art and are prepared by acidifying water glass.

The mixture also contains a phosphorus compound. Representative of the phosphorus compounds which may be used in the present invention are $H_3PO_4$, $H_3PO_2$, $H_3PO_3$, $(NH_4)H_2PO_4$, $(NH_4)_2HPO_4$, $K_3PO_4$, $K_2HPO_4$, $KH_2PO_4$, $Na_3PO_4$, $Na_2HPO_4$, $NaH_2PO_4$, $PX_3$, $RPX_2$, $R_2PX$, $R_3P$, $X_3PO$, $(XO)_3PO$, $(XO)_3P$, $R_3PO$, $R_3PS$, $RPO_2$, $RPS_2$, $RP(O)(OX)_2$, $RP(S)(SX)_2$, $R_2P(O)OX$, $R_2P(S)SX$, $RP(OX)_2$, $RP(SX)_2$, $ROP(OX)_2$, $RSP(SX)_2$, $(RS)_2PSP(SR)_2$, and $(RO)_2POP(OR)_2$, where R is an alkyl or aryl group such as a phenyl group and X is hydrogen, R, or halide. These compounds include primary, $RPH_2$, secondary, $R_2PH$ and tertiary, $R_3P$ phosphines such as butyl phosphine, the tertiary phosphine oxides $R_3PO$, such as tributylphosphine oxide, the tertiary phosphine sulfides, $R_3PS$, the primary, $RP(O)(OX)_2$, and secondary, $R_2P(O)OX$, phosphonic acids such as benzene phosphonic acid, the corresponding sulfur derivatives such as $RP(S)(SX)_2$ and $R_2P(S)SX$, the esters of the phosphonic acids such as dialkyl phosphonate, $(RO)_2P(O)H$, dialkyl alkyl phosphonates, $(RO)_2P(O)R$, and alkyl dialkyl-phosphinates, $(RO)P(O)R_2$; phosphinous acids, $R_2POX$, such as diethylphosphinous acid, primary, $(RO)P(OX)_2$, secondary, $(RO)_2POX$, and tertiary, $(RO)_3P$, phosphites, and esters thereof, such as the monopropyl ester, alkyl dialkylphosphinites, $(RO)PR_2$ and dialkyl alkylphosphinite, $(RO)_2PR$, esters. Corresponding sulfur derivates may also be employed including $(RS)_2P(S)H$, $(RS)_2P(S)R$, $(RS)P(S)R_2$, $R_2PSX$, $(RS)P(SX)_2$, $(RS)_2PSX$, $(RS)_3P$, $(RS)PR_2$ and $(RS)_2PR$. Examples of phosphite esters include trimethylphosphite, triethylphosphite, diisopropylphosphite, butylphosphite, and pyrophosphites such as tetraethylpyrophosphate. The alkyl groups in the mentioned compounds preferably contain one to four carbon atoms.

Other suitable phosphorus-containing compounds include ammonium hydrogen phosphate, the phosphorus halides such as phosphorus trichloride, bromide, and iodide, alkyl phosphorodichloridites, $(RO)PCl_2$, dialkylphosphorochloridites, $(RO)_2PCl$, dialkylphosphinochloridities, $R_2PCl$, dialkylphosphonochloridates, $(RO)(R)P(O)Cl$, dialkylphosphinochloridates, $R_2P(O)Cl$ and $RP(O)Cl_2$. Applicable corresponding sulfur derivatives include $(RS)PCl_2$, $(RS)_2PCl$, $(RS)(R)P(S)Cl$ and $R_2P(S)Cl$. Preferred phosphorus compounds are phosphoric acid, phosphorous acid and ammonium phosphate.

The three components of the mixture may be combined into a submixture prior to making the mixture. That is, the phosphorus compound may be added to the alumina sol to give a phosphorus modified alumina sol as described in U.S. Pat. No. 4,629,717 or 4,727,209 which are incorporated by reference. Once the phosphorus modified alumina sol is prepared it is combined with the acidified water glass, i.e., silica sol, and then processed as described herein. Another method involves using the phosphorus compound to acidify the water glass and then mixing the phosphorus modified silica sol with the alumina sol and processing as described herein. Finally, a phosphorus compound can be added to an alumina/silica sol which is prepared by the process set forth in U.S. Pat. No. 3,909,450 which is incorporated by reference.

Regardless of how the mixture of the three components is formed, it is necessary that the mixture contain sufficient aluminum, silicon and phosphorus to provide a final product that contains from about 5 to about 50 weight percent $Al_2O_3$, from about 10 to about 90 weight percent $SiO_2$ and from about 5 to about 40 weight percent $P_2O_5$.

The next step in the process of preparing the composite of this invention involves gelling the mixture described above. One such method involves combining a gelling agent with the mixture described above and then dispersing the resultant combined mixture into an oil bath or tower which has been heated to elevated temperatures such that gelation occurs with the formation of spheroidal particles. The gelling agents which may be used in this process are hexamethylene tetraamine, urea or mixtures thereof. The gelling agents release ammonia at the elevated temperatures which sets or converts the hydrosol spheres into hydrogel spheres. The spheres are then continuously withdrawn from the oil bath and typically subjected to specific aging and drying treatments in oil and an ammoniacal solution to further improve their physical characteristics. The resulting aged and gelled particles are then washed and dried at a relatively low temperature of about 93° C. to about 149° C. (200°–300° F.) and subjected to a calcination procedure at a temperature of about 454° C. to about 704° C. (850°–1300° F.) for a period of about 1 to about 20 hours. This provides an amorphous solid solution of phosphorus, silicon, and aluminum oxides.

Alternatively, the mixture of aluminum, phosphorus and silicon components may be gelled by spray drying the mixture or adding a gelling agent to the mixture and then spray drying. Spray drying is typically carried out at a temperature of 100° C. to about 760° C. (212° F. to 1400° F.) at about atmospheric pressure. It should be pointed out however that the pore structure of a spray dried material may not be the same as the pore structure of a spheroidal material prepared by the oil drop method.

As stated, the composite of this invention is characterized as a solid solution of phosphorus, aluminum and silicon oxides. What this means is that the instant composite does not contain separate phases of alumina, silica and phosphorus oxide. The instant composite may best be described as an alumina matrix which has been substituted with phosphorus and silicon atoms. The fact that it is amorphous means that it only has short range order and not the long range order associated with crystalline molecular sieves containing silicon, aluminum and phosphorus. Additionally as has been stated the acidity of the instant composite is derived from the amount of silica present in the composite and therefore the acidity can be controlled by varying the amount of silica in the final composite. The composite is also characterized in that it has pores whose average diameter ranges from about 30 to about 300 Angstroms, has a pore volume of about 0.35 to about 0.75 cc/g and has a surface area of about 200 to about 420 $m^2/g$.

The amorphous composite of this invention may be used as is to catalyze various hydrocarbon conversion processes or it may be used as a support for dispersing catalytic metals. Metals which are especially active in carrying out hydrocarbon conversion processes such as hydrocracking, isomerization and alkylation are the group VIB and group VIII metals and combinations thereof. The group VIB metals are chromium, molybdenum and tungsten while the group VIII metals are iron, cobalt, nickel, ruthenium, rhodium, palladium, osmium, iridium and platinum. Of these metals molybdenum, tungsten, nickel, cobalt, and mixtures of these metals are preferred. Especially preferred is a catalyst containing nickel and tungsten. The concentration of the metals varies considerably from about 0.1 to about 20 weight percent of the support for each metal. Specifically, when the metals are nickel and tungsten, the nickel is present in an amount from about 0.1 to about 3 weight percent and the tungsten is present from about 1 to about 20 weight percent. These metals may be dispersed on the amorphous composite of this invention by means well known in the art such as impregnating the support with a decomposable salt of the metals followed by calcination. Illustrative of the decomposable salts which can be used are: chromium chloride, chromium bromide, chromium nitrate, ammonium paramolybdate, ammonium metatungstate, iron chloride, iron bromide, iron nitrate, cobalt chloride, cobalt bromide, cobalt nitrate, nickel chloride, nickel bromide, nickel nitrate, ruthenium tetrachloride, rhodium trichloride, rhodium nitrate, palladic acid, palladium chloride, palladium nitrate, osmium tetrachloride, iridium tetrachloride, chloroplatinic acid and platinum tetrachloride.

The impregnation techniques which can be used in dispersing the metals include dip, evaporative and vacuum impregnation. One preferred method of impregnation involves the use of a steam-jacketed rotary drier. The amorphous composite is immersed in an impregnating solution and/or dispersion containing the desired components contained in the drier and the composite is tumbled therein by the rotating motion of the drier. Evaporation of the solution in contact with the tumbling composite is expedited by applying steam to the drier jacket. The resulting catalytic composite is dried and then calcined at a temperature of about 450° to about 700° C. to decompose the metal salts to the metal oxides. In some cases it may be desirable to sulfide the resultant catalytic composite and this may be done by a number of ways well known in the art. For example, after the metal or metals have been dispersed on the support, the resultant catalytic composite can be sulfided by contacting the catalyst with a sulfur containing compound such as hydrogen sulfide, carbon disulfide, mercaptans, disulfides, etc. The conditions under which the catalytic composite is sulfided include a temperature of about 20° to about 200° C. and a pressure from atmospheric to about 200 psig. The sulfiding may be carried out either in a batch mode or a continuous mode with a continuous mode being preferred.

The amorphous composites of this invention find application as hydrocarbon conversion catalysts either as is or after dispersion of catalytic metals thereon. Hydrocarbon conversion processes are well known in the art and include cracking, hydrocracking, isomerization, alkylation of both aromatics and isoparaffins, polymerization, reforming, hydrogenation, dehydrogenation, transalkylation, dealkylation, hydration, dehydration, hydrotreating, hydrodenitrogenation, hydrodesulfurization, methanation and syngas shift process. Specific reaction conditions and the types of feeds which can be used in these processes are well known in the art. For example, U.S. Pat. Nos. 4,310,440 and 4,440,871 disclose the conditions for the above-named processes and are incorporated by reference. Of the processes enumerated above, the amorphous composite of this invention are particularly suited for hydrocracking, cracking, and alkylation (especially aromatic alkylation).

Hydrocracking conditions typically include a temperature in the range of 400° to 1200° F. (204°-649° C), preferably between 600° and 950° F. (316°-510° C.). Reaction pressures are in the range of atmospheric to about 3,500 psig (24,132 kPa g), preferably between 200 and 3000 psig (1379-20,685 kPa g). Contact times usually correspond to liquid hourly space velocities (LHSV) in the range of about 0.1 $hr^{-1}$ to 15 $hr^{-1}$, preferably between about 0.2 and 3 $hr^{-1}$. Hydrogen circulation rates are in the range of 1,000 to 50,000 standard cubic feet (scf) per barrel of charge (178-8,888 std. $m^3/m^3$), preferably between 2,000 and 30,000 scf per barrel of charge (355-5,333 std. $m^3/m^3$). Suitable hydrotreating conditions are generally within the broad ranges of hydrocracking conditions set out above.

The reaction zone effluent is normally removed from the catalyst bed, subjected to partial condensation and vapor-liquid separation and then fractionated to recover the various components thereof. The hydrogen, and if desired some or all of the unconverted heavier materials, are recycled to the reactor. Alternatively, a two-stage flow may be employed with the unconverted material being passed into a second reactor. Catalysts of the subject invention may be used in just one stage of such a process or may be used in both reactor stages.

Catalytic cracking processes are preferably carried out with the compositions using feedstocks such as gas oils, heavy naphthas, deasphalted crude oil residua, etc. with gasoline being the principal desired product. Temperature conditions of 850° to 1100° F., LHSV values of 0.5 to 10 and pressure conditions of from about 0 to 50 psig are suitable.

Alkylation of aromatics usually involves reacting an aromatic ($C_6$ to $C_{12}$), especially benzene, with a monoolefin to produce a linear alkyl substituted aromatic. The process is carried out at an aromatic: olefin (e.g., benzene:olefin) ratio of between 5:1 and 30:1, a LHSV of about 0.3 to about 6 $hr^{-1}$, a temperature of about 100° to about 250° C. and pressures of about 200 to about 1000 psig. Further details on apparatus may be found in U.S. Pat. No. 4,870,222 which is incorporated by reference.

The following examples are presented in illustration of this invention and are not intended as undue limitations on the generally broad scope of the invention as set out in the appended claims.

EXAMPLE 1

Several compositions were prepared containing phosphorus, silicon and aluminum or silicon and aluminum only. The procedure described below was used to prepare these samples.

Metallic aluminum was digested in dilute hydrochloric acid at a temperature of about 102° C. to yield a hydrosol containing polymeric alumina hydroxy chloride in about 0.88 Al:Cl weight ratio (12.5 weight percent Al). Thereafter, an amount of phosphoric acid calculated to provide the respective phosphorus content of each calcined spherical particle other than the particles used as controls was added to the hydrosol. Appropriate amounts of water were added in each experiment to maintain alumina and aluminum phosphate solids contents between 25 to 30%. Each hydrosol containing phosphorus was then cooled and mixed with aqueous hexamethylene tetraamine (HMT) solution to provide a hydrosol containing an HMT:Cl molar ratio of 0.4. The mixture was maintained at 5° to 10° C.

A batch of acidified water glass was prepared by adding concentrated HCl to a diluted water glass such that a Cl:Na molar ratio of 1.10 and a $SiO_2$ content of 11% was achieved. The phosphorus containing alumina sol was then added to the acidified water glass to form an acidic solution containing phosphorus, alumina and silica hydrosol.

The hydrosol was formed into spheroidal hydrogel particles by emitting the hydrosol as droplets into a dropping tower containing an oil suspending medium at a temperature of about 95° C. The spherical gel particles were aged in a portion of the gas oil for about 19 hours at about 100° C. After the aging treatment, spheres were washed with water at a temperature of about 95° C. and subsequently dried at a temperature of about 120° C. for a period of two hours. Finally, the amorphous silica/alumina/phosphate spheres were calcined at a temperature of about 650° C. for about 2 hours in the presence of (3% $H_2O$) moist air.

The properties of the spheres prepared according to the above procedure are presented in Table 1.

TABLE 1

| | Properties of Spherical Particles | | | |
|---|---|---|---|---|
| Sample | 1 | 2 | 3 | 4 |
| Wt % $P_2O_5$ | 0 | 0 | 30 | 13 |
| Wt % $Al_2O_3$ | 50 | 25 | 28 | 27 |
| Wt % $SiO_2$ | 50 | 75 | 42 | 60 |
| X-ray Phase I.D. | Amorphous | Amorphous | Amorphous | Amorphous |
| Surface Area ($m^2/g$) | 336 | 372 | 257 | 308 |
| Pore Volume (cc/g) | 0.68 | 0.64 | 0.81 | 0.54 |
| Pore Diameter (Å) | 81 | 68 | 127 | 71 |
| ABD | 0.52 | 0.62 | 0.49 | 0.64 |

EXAMPLE 2

The spherical particles prepared in Example 1 were impregnated with nickel and tungsten salts to provide metal containing hydrocracking catalysts.

Appropriate amounts of ammonium metatungstate and nickel nitrate were dissolved in deionized water and placed into a steam jacketed rotary dryer. To this solution there were added about 102 grams of the desired spherical particles described in Example 1 and the mixture was rolled at room temperature for about 30 minutes followed by complete evaporation of the excess water by the application of steam to the rotary dryer. The resultant Ni/W catalyst particles were calcined for 1 hour at 204° C. followed by 2 hours at 565° C. During the calcination air was flowed through the calcining oven at a rate of 1.5 cubic feet per hour. The composition of the finished catalysts is presented in Table 2.

TABLE 2

| | Properties of Catalysts | | | |
|---|---|---|---|---|
| Sample | 5 | 6 | 7 | 8 |
| Base No. | 1 | 2 | 3 | 4 |
| ABD | 0.71 | 0.76 | 0.57 | 0.75 |
| % Ni | 0.6 | 1.0 | 0.67 | 0.57 |
| % W | 6.0 | 10.0 | 6.65 | 5.72 |

EXAMPLE 3

The catalysts prepared in Example 2 were tested in a pilot plant using Light Arabian VGO, which crude had the following properties.

| Specific Gravity @ 60° F. | 0.9206 |
|---|---|
| Initial Boiling Point | 670° F. |
| 10% | 830° F. |
| 20% | 849° F. |
| 30% | 860° F. |
| 40% | 879° F. |
| 50% | 900° F. |
| 60% | 917° F. |
| 70% | 933° F. |
| 80% | 955° F. |
| 90% | 979° F. |
| End Boiling Point | 1027° F. |

Each of the catalysts was tested under the following test conditions:

| Test conditions: | |
|---|---|
| Plant Pressure | 2000 psig |
| LHSV | 1.0 $hr^{-1}$ |
| CFR | 1.0 |
| Recycle $H_2$ | 10,000 SCF $B_{FF}$ |

The activity results of each of the catalysts tested is presented in Table 3.

TABLE 3

| | Activity of Catalysts Tested | | | |
|---|---|---|---|---|
| Catalyst | 5 | 6 | 7 | 8 |
| Temp °F. | 781 | 783 | 801 | 784 |
| Conversion to 550° F. at 12 hrs. | 85 | 80 | 71 | 80 |
| Conversion to 550° F. at 62 hrs. | 64 | 70 | 66 | 76 |
| Kerosine Yields wt. % (300–550° F.) | | | | |
| 80% Conversion to 550° F. | 45 | 42 | — | 45 |
| 70% Conversion to 550° F. | 41 | 39 | 43 | — |

| | Total Liquid Yield | |
|---|---|---|
| Catalyst | 5 | 8 |
| Conversion to 700° F. wt % | 94 | 94 |
| Total Liquid Yield | 86.7 | 87.9 |
| $C_5$–300° F. (Gasoline) | 28.4 | 26.3 |
| 300–550° F. (Kerosine) | 44.4 | 44.7 |
| 550–700° F. (Diesel) | 13.9 | 16.9 |

The test results presented in Table 3 clearly show the advantages of a catalyst prepared with a silica/alumina/phosphate solid solution support. This is shown by the smaller rate of deactivation of the phosphorus containing compositions and the higher kerosine yield.

We claim as our invention:

1. A catalytic composite comprising an amorphous solid solution of phosphorus, silicon and aluminum oxides containing from about 5 to about 50 weight percent $Al_2O_3$, from about 10 to about 90 weight percent $SiO_2$ and from about 5 to about 40 weight percent $P_2O_5$.

2. The composite of claim 1 where the composite has pores whose average diameters are from about 30 to about 200 Angstroms.

3. The composite of claim 1 where the composite has a surface area of about 200 to about 420 $m^2/g$.

4. The composite of claim 1 where the composite has a pore volume of about 0.35 to about 0.75 cc/g.

5. The composite of claim 1 where the composite has dispersed thereon one or more metals selected from the group consisting of Groups VIB and VIII metals of the Periodic Table.

6. The composite of claim 5 where the Group VIB metal is tungsten and is present in a concentration from about 0.1 to about 3 weight percent of the composite and the Group VIII metal is nickel and is present in a concentration from about 1 to about 20 weight percent of the composite.

7. A process for preparing a catalytic composite comprising an amorphous solid solution of phosphorus, silicon and aluminum oxides containing from about 5 to about 50 weight percent $Al_2O_3$, from about 10 to about 90 weight percent $SiO_2$ and from about 5 to about 40 weight percent $P_2O_5$, the process comprising forming a mixture of an alumina hydrosol, a silica hydrosol and a phosphorus compound, gelling the mixture to form particles and calcining the particles to provide an amorphous solid solution of phosphorus, silicon and aluminum oxides.

8. The process of claim 7 where the gelation is effected by combining the mixture with a gelling agent dispersing said combined mixture as droplets in an oil bath at conditions to gel the droplets into particles, isolating the particles and calcining the particles to obtain spheroidal particles comprising an amorphous solid solution of phosphorus, silicon and aluminum oxides.

9. The process of claim 8 where the gelling agent is hexamethylenetetraamine.

10. The process of claim 8 where the gelling agent is urea.

11. The process of claim 7 where the gelation is effected by spray drying the mixture.

12. The process of claim 7 where the phosphorus compound is selected from the group consisting of phosphoric acid, phosphorous acid and ammonium phosphate.

* * * * *